US012767536B2

(12) United States Patent
Young et al.

(10) Patent No.: US 12,767,536 B2
(45) Date of Patent: Oct. 20, 2026

(54) SYSTEMS AND METHODS FOR COMBINED ELECTRODE MATERIAL SYNTHESIS

(71) Applicant: Li Industries, Inc., Pineville, NC (US)

(72) Inventors: David Young, Sudbury, MA (US); Panni Zheng, Blacksburg, VA (US); Tairan Yang, Blacksburg, VA (US); Zheng Li, Blacksburg, VA (US)

(73) Assignee: Li Industries, Inc., Pineville, NC (US)

( * ) Notice: Subject to any disclaimer, the term of this patent is extended or adjusted under 35 U.S.C. 154(b) by 0 days.

(21) Appl. No.: 18/819,658

(22) Filed: Aug. 29, 2024

(65) Prior Publication Data

US 2025/0083960 A1 Mar. 13, 2025

Related U.S. Application Data

(60) Provisional application No. 63/581,305, filed on Sep. 8, 2023.

(51) Int. Cl.
*H01M 4/36* (2006.01)
*C01B 25/45* (2006.01)
(Continued)

(52) U.S. Cl.
CPC ............. *C01B 25/45* (2013.01); *H01M 4/366* (2013.01); *H01M 4/525* (2013.01); *H01M 4/625* (2013.01);
(Continued)

(58) Field of Classification Search
CPC ....... C01B 25/45; H01M 4/366; H01M 4/525; H01M 4/625; H01M 10/54; H01M 4/5825;
(Continued)

(56) References Cited

U.S. PATENT DOCUMENTS 7,902,299 B2 3/2011 Kerr et al.
8,067,107 B2 11/2011 Sloop et al.
(Continued)

FOREIGN PATENT DOCUMENTS

CN 102017277 A 4/2011
KR 20200036625 A 4/2020
(Continued)

OTHER PUBLICATIONS

International Search Report and Written Opinion for Application No. PCT/US2024/044470, dated Mar. 4, 2025, 12 pages.
(Continued)

*Primary Examiner* — Gordon Baldwin
*Assistant Examiner* — Christina D Mcclure
(74) *Attorney, Agent, or Firm* — COOLEY LLP

(57) ABSTRACT

Systems and methods for forming finished electrode materials are described herein. The method includes mixing an electrode material and an electrode material precursor to form a material mixture and heating the material mixture to produce a finished electrode material. In some embodiments, at least one of an electrode material or an electrode material precursor can be partially or entirely formed from a battery waste material. The methods provided herein provide a sustainable and efficient pathway to produce finished electrode materials, and also expand the pool of source materials for the production of finished electrode materials.

31 Claims, 9 Drawing Sheets

(51) Int. Cl.

| | |
|---|---|
| ***H01M 4/525*** | (2010.01) |
| ***H01M 4/62*** | (2006.01) |
| ***H01M 10/54*** | (2006.01) |

(52) U.S. Cl.
CPC ......... *H01M 10/54* (2013.01); *C01P 2002/72* (2013.01); *C01P 2006/40* (2013.01)

(58) Field of Classification Search
CPC .............. C01P 2002/72; C01P 2006/40; Y02E 60/10
See application file for complete search history.

(56) References Cited

U.S. PATENT DOCUMENTS

| | | | | |
|---|---|---|---|---|
| 8,497,030 | B2 | 7/2013 | Sloop | |
| 8,823,329 | B2 | 9/2014 | Sloop et al. | |
| 8,846,225 | B2 | 9/2014 | Sloop | |
| 9,287,552 | B2 | 3/2016 | Sloop | |
| 9,484,606 | B1 | 11/2016 | Sloop et al. | |
| 9,825,341 | B2 | 11/2017 | Sloop | |
| 10,014,562 | B2 | 7/2018 | Sloop | |
| 10,333,183 | B2 | 6/2019 | Sloop | |
| 10,697,909 | B2 | 6/2020 | Loeffler et al. | |
| 11,394,062 | B2 | 7/2022 | Sloop | |
| 2002/0039687 | A1* | 4/2002 | Barker | H01M 4/485 429/231.95 |
| 2009/0311591 | A1* | 12/2009 | Snyder | H01M 4/0421 429/156 |
| 2010/0146761 | A1 | 6/2010 | Sloop | |
| 2010/0203366 | A1 | 8/2010 | Sloop | |
| 2014/0134491 | A1* | 5/2014 | Sugimoto | C01G 53/50 429/223 |
| 2017/0200989 | A1 | 7/2017 | Sloop | |
| 2017/0214044 | A1* | 7/2017 | Huang | H01M 4/525 |
| 2019/0260100 | A1 | 8/2019 | Sloop | |
| 2021/0143489 | A1 | 5/2021 | Sloop et al. | |
| 2022/0029217 | A1 | 1/2022 | Young et al. | |
| 2022/0271356 | A1 | 8/2022 | Sloop et al. | |
| 2022/0352572 | A1 | 11/2022 | Sloop | |
| 2023/0070883 | A1 | 3/2023 | Sloop et al. | |
| 2023/0198041 | A1 | 6/2023 | Sloop et al. | |
| 2023/0268574 | A1* | 8/2023 | Dai | H01M 4/525 429/231.95 |
| 2023/0369671 | A1 | 11/2023 | Zheng et al. | |
| 2023/0395889 | A1 | 12/2023 | Yang et al. | |
| 2023/0411725 | A1 | 12/2023 | Yang et al. | |
| 2024/0055597 | A1* | 2/2024 | Lee | C01G 51/42 |

FOREIGN PATENT DOCUMENTS

| | | | | |
|---|---|---|---|---|
| KR | 20230037317 | A | 3/2023 | |
| WO | WO-2009105713 | A1 | 8/2009 | |
| WO | WO-2010014637 | A1 | 2/2010 | |
| WO | WO-2010077982 | A2 | 7/2010 | |
| WO | WO-2011109831 | A2 | 9/2011 | |
| WO | WO-2016022858 | A1 | 2/2016 | |
| WO | WO-2017142644 | A2 | 8/2017 | |
| WO | WO-2020236513 | A1 | 11/2020 | |
| WO | WO-2021096990 | A1 | 5/2021 | |
| WO | WO-2022109453 | A1 * | 5/2022 | B03B 9/06 |
| WO | WO-2023019224 | A1 | 2/2023 | |
| WO | WO-2023060992 | A1 | 4/2023 | |
| WO | WO-2023068525 | A1 * | 4/2023 | B09B 3/40 |
| WO | WO-2025054076 | A2 | 3/2025 | |

OTHER PUBLICATIONS

Zhao et al. "Regeneration and reutilization of cathode materials from spent lithium-ion batteries." Chemical Engineering Journal. Mar. 1, 2020;383:123089; 20 pages.

* cited by examiner

SYSTEMS AND METHODS FOR COMBINED ELECTRODE MATERIAL SYNTHESIS

CROSS-REFERENCE TO RELATED APPLICATIONS

This application claims priority to and benefit of U.S. Provisional Application No. 63/581,305, filed Sep. 8, 2023, and entitled "Systems and Methods for Combined Electrode Material Synthesis," the entire disclosure of which is hereby incorporated by reference herein.

TECHNICAL FIELD

Embodiments described herein relate to apparatus, systems, and methods for producing a finished electrode material by combining a battery electrode material and an electrode precursor material.

BACKGROUND

Rechargeable batteries (e.g., lithium-ion, nickel-metal hydride, nickel-zinc, nickel-cadmium, and lead-acid batteries) are integral components of modern consumer and industrial technology. These batteries are used in a wide range of applications, including but not limited to electric vehicles, grid energy storage systems, and portable electronic devices such as laptops, tablets, and smart phones. As the prevalence of rechargeable batteries continues to grow, leading to larger volumes of discarded devices, the recycling of these devices becomes increasingly important from the perspective of both environmental sustainability and manufacturing economics. For example, as these batteries can incorporate relatively costly materials such as nickel, cobalt, lithium metals, and other expensive metals, alloys, and compounds, the recycling of used/waste batteries becomes a crucial strategy for reducing the manufacturing costs of new batteries. However, the production capacity can be limited by the size of the waste stream.

SUMMARY

Embodiments described herein relate to producing a finished electrode material by combining a battery electrode material and an electrode precursor material. In some embodiments, at least one of the electrode material or the electrode material precursor is partially or entirely formed from a battery waste material. In some embodiments, a battery electrode material may include one or more battery electrode material and/or an electrode precursor material may include one or more electrode precursor material.

In some embodiments, provided herein is a method of forming a finished electrode material. The method includes mixing the electrode material and the electrode material precursor to form a material mixture and heating the material mixture at a temperature between about 400° C. and about 1,200° C. to produce a finished electrode material. In some embodiments, the mixing is performed for a duration of about 1 minute to about 50 hours, about 1 minute to about 24 hours, about 10 minutes to about 24 hours, about 10 minutes to about 12 hours, or about 1 hour to about 12 hours. In some embodiments, the method further includes preprocessing at least one of an electrode material or an electrode material precursor prior to mixing the electrode material and the electrode material precursor. In some embodiments, the method further includes at least one of the steps of milling the material mixture or drying the material mixture prior to the heating the material mixture.

In some embodiments, the method further includes at least one of the steps of milling at least one of the electrode material or the electrode material precursor, drying at least one of the electrode material or the electrode material precursor or heating at least one of the electrode material or the electrode material precursor prior to the mixing of the electrode material and the electrode material precursor.

In some embodiments, the finished electrode material is a commercial grade electrode material. In some embodiments, the method includes postprocessing the finished electrode material to form a commercial grade electrode material.

DETAILED DESCRIPTION

Figure 1:
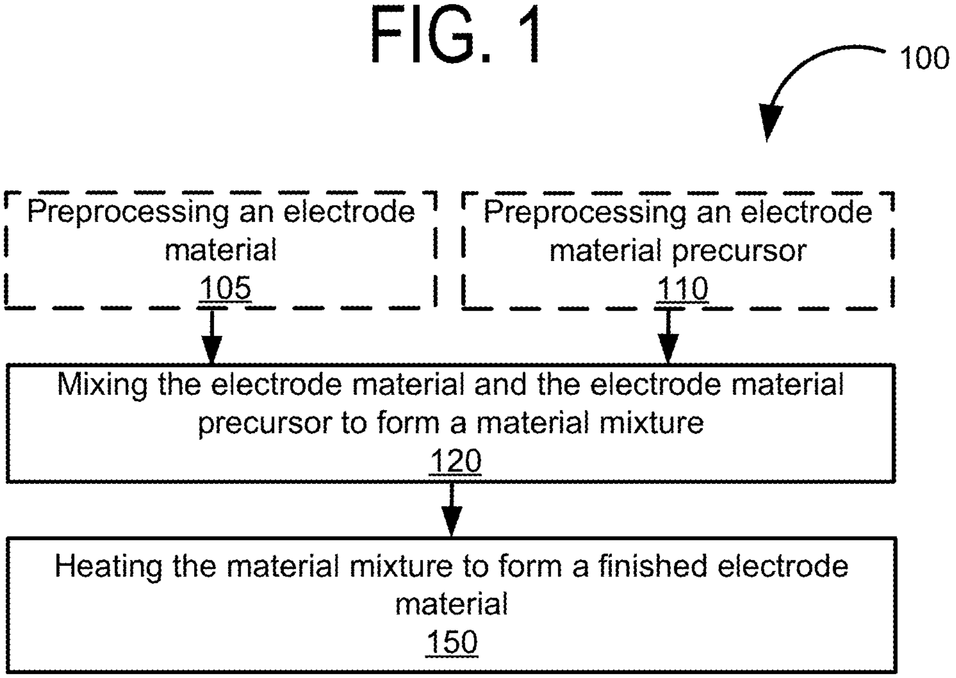
FIG. 1 is a schematic flow chart of a method of forming a finished electrode material, according to an embodiment.

Embodiments described herein relate to apparatus, systems, and methods for producing a finished electrode material by combining a battery electrode material and an electrode precursor material. In some embodiments, at least one of the battery electrode material or the electrode precursor material includes a recycled material, either partially or entirely. In some embodiments, the electrode material can include used electrode material.

In some embodiments, provided herein is a method of forming a finished electrode material. The method includes mixing the electrode material and the electrode material precursor to form a material mixture and heating the material mixture at a temperature between about 400° C. and about 1,200° C. to produce a finished electrode material. In some embodiments, the material mixture is heated for a duration of about 10 minutes to about 20 hours. In some embodiments, the heating is under vacuum. In some embodiments, the electrode material have a first metal content and the electrode material precursor have a second metal content, a molar ratio of the first metal content to the second metal content is in a range of 1:99 to 99:1.

In some embodiments, the electrode material includes at least one of $LiCoO_2$, $LiMn_2O_4$, NCM, $Li_xM_yPO_4$, where M is a transition metal and x and y are positive real numbers, LFP, a derivative of LFP, $LiM_kFe_{1-k}PO_4$, or $Li_{1-k}M_kPO_4$, where $0<k<1$. In some embodiments, the electrode material precursor includes at least one of $Li_2CO_3$, LiOH, $Li_3PO_4$, $FePO_4$, $Fe_2O_3$, $Fe_3O_4$, $Fe(C_2H_3O_2)_2$, $FeSO_4$, $FeC_2O_4$, $Fe_3(PO_4)_2$, $(NH_4)_3PO_4$, $NH_4H_2PO_4$, $(NH_4)_2HPO_4$, $Co_3O_4$, CoO, $Co(OH)_2$, $CoCO_3$, CoSO4, $Co(NO_3)_2$, $Ni(OH)_2$, $Ni(NO_3)_2$, $Ni(CH_3COO)_2$, $NiSO_4$, $Mn(OH)_2$, $Mn(NO_3)_2$, $Mn(CH_3COO)_2$, $MnSO_4$, $Al(NO_3)_3$, $Al_2(SO_4)_3$, $Al(OCH(CH_3)_2)_3$, $Ni_{0.33}Mn_{0.33}Co_{0.33}(OH)_2$ (NMC111$(OH)_2$), $Ni_{0.5}Mn_{0.3}Co_{0.2}(OH)_2$ (NMC532 $(OH)_2$), $Ni_{0.6}Mn_{0.2}Co_{0.2}(OH)_2$ (NMC622 $(OH)_2$), or $Ni_{0.8}Mn_{0.1}Co_{0.1}(OH)_2$ (NMC811 $(OH)_2$).

In some embodiments, at least one of an electrode material or an electrode material precursor is partially or entirely formed from a battery waste material. In some embodiments, the battery waste material includes at least one of defect, scrap, or end-of-life lithium-ion batteries.

In some embodiments, the method further includes preprocessing at least one of an electrode material or an electrode material precursor prior to mixing the electrode material and the electrode material precursor. In some embodiments, the preprocessing may include separating an active material from a conductive material and a binder to form the electrode material.

In some embodiments, the method further includes at least one of the steps of milling the material mixture or drying the material mixture prior to the heating the material mixture.

The methods provided herein helps alleviate the need for virgin materials, contributing to cost-effective and sustainable production practices.

Recycling of lithium-ion batteries is important for the reclamation of materials for reuse. These materials can be provided as inputs into the manufacturing of new lithium-ion batteries, which can reduce the environmental and economic impact of lithium-ion battery production. Direct recycling is a method of recycling that can recover electrode materials in a non-destructive manner, which can preserve the structure, morphology, and/or electrochemical performance of the electrode materials. Direct recycling can also be performed in conjunction with new electrode material synthesis to produce electrode materials that are a blend of directly recycled and newly synthesized electrode materials.

Lithium-ion battery manufacturing can generate significant quantities of waste, including from production scrap, defect batteries, waste slurries, defect materials, or other sources. This waste can have a deleterious effect on the environment if not properly disposed of, or recycled. Additionally, batteries that reach their end of life or are otherwise discarded need to be properly disposed of, or recycled. Direct recycling of batteries and battery waste can recover materials for new battery manufacturing from both lithium-ion battery manufacturing and end-of-life disposal of lithium-ion batteries. These directly recycled materials can provide a source of electrode materials that can either be used as a standalone material, processed or mixed with other battery materials, or processed together with the manufacturing of new electrode through co-synthesis.

Systems and methods described herein relate to the co-synthesis of electrode materials. The co-synthesis process can include processing of batteries and battery waste over several steps to isolate, purify and/or regenerate one or more recoverable battery components, such as electrode materials. Additionally, the co-synthesis process can include the simultaneous synthesis of new electrode materials from electrode material precursors.

Properly combining the electrode materials, especially waste electrode materials, and the electrode material precursors can lead to a more efficient pathway to produce electrode materials, and also expand the pool of source materials for the production of electrode materials. Accordingly, the methods provided herein offers several notable advantages including (a) reducing the demand for new raw materials; (b) minimizing the ecological footprint associated with mining and processing these resources; (c) decreasing the overall cost of manufacturing energy storage devices and making them more economically accessible to a broader range of consumers and industries; (d) repurposing recycled materials, extending the usable lifespan of finite resources.

All definitions, as defined and used herein, should be understood to control over dictionary definitions, definitions in documents incorporated by reference, and/or ordinary meanings of the defined terms.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein, the term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used in this specification, "co-synthesis" can include processing at least one electrode material with at least one electrode material precursor to form co-synthesized electrode materials. For example, new lithium iron phosphate cathode material can be produced via co-synthesis from a mixture of lithium iron phosphate, lithium carbonate, and iron phosphate. In some embodiments, the electrode material is derived from battery waste. In some embodiments, the electrode material is lithium deficient. As used herein, reference to any electrode material can also refer to a lithium deficient form of that electrode material. In some embodiments, the lithium deficiency of the electrode material is stoichiometrically less than 1%, less than 2%, less than 3%, less than 4%, less than 5%, less than 6%, less than 7%, less than 8%, less than 9%, less than 10%, less than 15%, less than 20%, less than 25%, less than 30%, less than 40%, less than 50%, less than 60%, less than 70%, less than 80%, less than 90%, less than 95%, or less than 99%. In some embodiments, the electrode material has surface or bulk damage, which can be from previous usage or processing of the electrode material. In some embodiments, the electrode material has some other feature common to electrode material harvested from battery waste, such as the formation of solid-electrolyte or cathode-electrolyte interface, carbon or other organic residues, or impurities. In some embodiments, co-synthesis can include the direct recycling processing of one or more electrode materials together with the synthesis of new electrode materials from electrode material precursors. In some embodiments, the electrode material precursors are themselves recycled materials or derived from recycled materials.

As used in this specification, "co-synthesize" includes using a co-synthesis method. As used in this specification, "co-synthesized" material refers to a material that has been produced partially or wholly through a co-synthesis method.

As used in this specification, "battery waste" can include spent battery material, battery manufacturing waste, defect batteries, or subsets thereof. For example, battery waste can include electrode material, separator material, current collector material, electrolyte, lithium salts, packaging, or any combination thereof.

As used in this specification, "electrode material" can refer to active material, conductive material, binder, or any combination thereof. For example, electrode material can refer to active material only, active material and conductive material, active material and binder, conductive material and binder, or active material, conductive material, and binder. Electrode material can include anode materials and/or cathode materials. In some embodiments, the electrode material can include cathode active material, cathode conductive material, cathode binder cathode current collector material, or any combination thereof. In some embodiments, the electrode material can include anode active material, anode conductive material, anode binder, anode current collector material, or any combination thereof. For example, the electrode material can include cathode active material, cathode conductive material, cathode binder, cathode current collector material, anode active material, anode conductive material, anode binder, anode current collector material, or any combination thereof.

Some embodiments described herein can include any of the recycling aspects of U.S. Pat. No. 11,631,909 ("the '909 patent"), filed Nov. 26, 2019 and titled "Methods and Systems for Scalable Direct Recycling of Batteries," the disclosure of which is hereby incorporated by reference in its entirety. Some embodiments described herein can include any of the recycling aspects of U.S. patent application Ser. No. 18/314,873 ("the '873 application"), filed May 10, 2023 and titled, "Methods and Systems for Scalable Direct Recycling of Battery Waste," the disclosure of which is hereby incorporated by reference in its entirety.

As used in this specification, "electrode material precursor" can refer to a material precursor that is used to synthesize electrode materials. For example, electrode material precursor can refer to lithium sources, such as $Li_2CO_3$, LiOH, $Li_3PO_4$, iron sources, such as $FePO_4$, $Fe_2O_3$, $Fe_3O_4$, $Fe(C_2H_3O_2)_2$, $FeSO_4$, $FeC_2O_4$, $Fe_3(PO_4)_2$, cobalt sources, such as $Co_3O_4$, CoO, $Co(OH)_2$, $CoCO_3$, $CoSO_4$, $Co(NO_3)_2$, nickel sources, such as NiO, $Ni(OH)_2$, $Ni(NO_3)_2$, $Ni(CH_3COO)_2$, $NiSO_4$, manganese sources, such as, $Mn_2O_3$, $Mn_3O_4$, $Mn(OH)_2$, $Mn(NO_3)_2$, $Mn(CH_3COO)_2$, $MnSO_4$, aluminum sources, such as $Al_2O_3$, $Al(NO_3)_3$, $Al_2(SO_4)_3$, $Al(OCH(CH_3)_2)_3$ (Aluminum isopropoxide), or mixed transition metal precursors, such as $Ni_{0.33}Mn_{0.33}Co_{0.33}(OH)_2$ (NMC111$(OH)_2$), $Ni_{0.5}Mn_{0.3}Co_{0.2}(OH)_2$ (NMC532 $(OH)_2$), $Ni_{0.6}Mn_{0.2}Co_{0.2}(OH)_2$ (NMC622$(OH)_2$), $Ni_{0.8}Mn_{0.1}Co_{0.1}(OH)_2$ (NMC811 $(OH)_2$), and $Ni_{0.9}Mn_{0.05}Co_{0.05}(OH)_2$.

FIG. 1 is a flow diagram of method 100 for producing co-synthesized finished electrode material from at least one electrode material and at least one electrode material precursor, according to an embodiment. The method 100 includes mixing an electrode material and the electrode material precursor 120 to form a material mixture and heating the material mixture 150 at a temperature between about 400° C. and about 1,200° C. to produce a finished electrode material. The method 100 includes optionally preprocessing the at least one electrode material 100 to prepare the electrode material for further processing. The method 100 includes optionally preprocessing the at least one electrode material precursor 110 to prepare the electrode material precursor for further processing. Step 120 includes mixing the at least one electrode material and the at least one electrode material to form a material mixture (i.e., a precursor mixture prior to obtaining a finished electrode material). Step 150 includes heat treatment of the electrode material and precursor mixture using a variety of processes to synthesize electrode material (referred to also as co-synthesized electrode material). In some embodiments, the method 100 produces commercial-grade electrode materials. That is, in some embodiments, the finished electrode material is a commercial-grade electrode material. In some embodiments, the method 100 requires one or more steps of postprocessing to obtain a commercial grade electrode material.

In some embodiments, the electrode material is harvested from a battery waste. Step 105 can include preprocessing the battery waste to yield electrode material. In some embodiments, the electrode material is harvested using a recycling method. In some embodiments, the electrode material is harvested using a direct recycling method. In some embodiments, the battery waste stream can include used, defect, scrap, or end-of-life lithium-ion batteries, or combinations thereof. In some embodiments, the battery waste stream can include electrode scrap materials. In some embodiments, the electrode scrap materials can include at least one electrode material. In some embodiments, the electrode scrap materials can include at least one current collector material. In some embodiments, the electrode scrap materials can include black mass or other shredded, ground, milled, sectioned, or otherwise mechanically processed battery waste. In some embodiments, the battery waste stream can include any combination of the aforementioned electrode forms.

In some embodiments, the harvesting of the electrode materials can include any of the processes and instrumentations described in the '909 patent and the '873 application (e.g., washing, separation, sieving, flotation, etc.). In some embodiments, step 105 can include partially or fully removing other impurities in the electrode materials, such as anode, carbon, binder, electrolyte, casing materials, separator, aluminum, and/or copper. In some embodiments, step 105 can include downsizing the electrode materials as well as any impurities to generate a more uniform, homogeneous mixture. In some embodiments, the electrode materials and/or impurities can be downsized via methods such as shredding, cutting, milling, and/or crushing. In some embodiments, step 105 can include separating anode active material, anode conductive material, anode binder, or any combination thereof from other battery waste components. In some embodiments, step 105 can include separating cathode active material, cathode conductive material, cathode binder, or any combination thereof from other battery waste components. In some embodiments, step 105 can include separating cathode active material, cathode conductive material, cathode binder, anode active material, anode conductive material, anode binder, or any combination thereof from other battery waste components. Step 105 can include isolation and recovery of electrode material (e.g., active material optionally with binder and/or conductive material with impurities, etc.). In some embodiments, the electrode material is lithium deficient. In some embodiments, the electrode material has structural or surface damage. In some embodiments, the electrode material contains impurities from other parts of a battery or from preprocessing.

In some embodiments, step 110 can include preprocessing the electrode material precursors to synthesize electrode materials with improved quality. In some embodiments, the electrode material precursors contain impurities. Step 110 can include preprocessing the electrode material precursors to remove the impurities. In some embodiments, the electrode material precursors contain crystallized water. Step 110 can include preprocessing the electrode material precursors to remove the crystallized water. In some embodiments, step 110 can include preprocessing the electrode material precursors to adjust their chemical compositions. In some embodiments, step 110 is carried out by heat treatment. In some embodiments, electrode material precursors are heat-treated individually. In some embodiments, electrode material precursors are heat-treated together. In some embodiments, step 110 includes the combinations of the above-mentioned heat treatment methods. In some embodiments, step 110 includes milling, drying and/or mixing steps.

Production of virgin electrode materials typically includes mixing at least one electrode material precursor, followed by a combination of optionally milling, optionally drying, and synthesis. As shown in FIG. 1, method 100 includes combining an electrode material and an electrode precursor material and then synthesizing them together to produce high-performance electrode materials.

The electrode material precursor can include any compounds that can be used to synthesize the virgin electrode materials. In some embodiments, the electrode material can include $Li_xM_yPO_4$, where M is a transition metal and x and y are positive real numbers. In some embodiments, the electrode material can include LFP. In some embodiments, the electrode material can include a derivative of LFP (e.g., $LiM_kFe_{1-k}PO_4$, or $Li_{1-k}M_kPO_4$, where 0<k<1). In some embodiments, the electrode material can include $LiCoO_2$ (also referred to herein as lithium cobalt oxide or LCO), $LiMn_2O_4$ (also referred to herein as lithium manganese oxide or LMO), and $LiNi_wMn_xCo_yAl_zO_2$ where w+x+y+z=1 (also referred to herein as lithium nickel cobalt manganese oxide, NCM, lithium nickel cobalt aluminum oxide, or NCA). In some embodiments, any one of w, x, y, or z can be zero. In some embodiments, lithium electrode material precursors can include $Li_2CO_3$, LiOH, and $Li_3PO_4$. In some embodiments, the electrode material precursors for lithium iron phosphate (LFP) production can include $Li_2CO_3$, LiOH, $Li_3PO_4$, $FePO_4$, $Fe_2O_3$, $Fe_3O_4$, $Fe(C_2H_3O_2)_2$, $FeSO_4$, $FeC_2O_4$, $Fe_3(PO_4)_2$, $(NH_4)_3PO_4$, $NH_4H_2PO_4$, and $(NH_4)_2HPO_4$, or any combinations thereof. In some embodiments, cobalt electrode material precursors can include $Co_3O_4$, CoO, $Co(OH)_2$, $CoCO_3$, CoSO4, and $Co(NO_3)_2$. In some embodiments, nickel electrode material precursors can include $Ni(OH)_2$, $Ni(NO_3)_2$, $Ni(CH_3COO)_2$, and $NiSO_4$. In some embodiments, manganese electrode material precursors can include $Mn(OH)_2$, $Mn(NO_3)_2$, $Mn(CH_3COO)_2$, and MnSO4. In some embodiments, aluminum electrode material precursors include $Al(NO_3)_3$, $Al_2(SO_4)_3$, and $Al(OCH(CH_3)_2)_3$ (aluminum isopropoxide). In some embodiments, mixed transition metal electrode material precursors for lithium nickel cobalt manganese oxide (NCM) electrodes include $Ni_{0.33}Mn_{0.33}Co_{0.33}(OH)_2$ (NMC111$(OH)_2$), $Ni_{0.5}Mn_{0.3}Co_{0.2}(OH)_2$ (NMC532$(OH)_2$), $Ni_{0.6}Mn_{0.2}Co_{0.2}(OH)_2$ (NMC622$(OH)_2$), $Ni_{0.8}Mn_{0.1}Co_{0.1}(OH)_2$ (NMC811$(OH)_2$), and $Ni_{0.9}Mn_{0.05}Co_{0.05}(OH)_2$. In some embodiments, step 12 includes preprocessing several precursor materials to form at least one single and uniform precursor material. In some embodiments, the precursor materials are processed by methods including, but not limited to, co-precipitation, sol-gel synthesis, solid state synthesis, plasma synthesis, or other known synthesis methods for electrode materials.

In some embodiments, the amount of electrode materials and electrode material precursor used in method 100 is the stoichiometry amount that forms the final electrode materials. In some embodiments, one or more than one electrode material precursor exceeds their stoichiometry amount to compensate for any losses during other steps in method 100. In some embodiments, the lithium source precursor exceeds the stoichiometry amount by about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%. In some embodiments, the electrode material is used as end-of-life electrode material, and the chemical composition is quantified by Inductively Coupled Plasma Mass Spectrometry (ICP-MS). In some embodiments, at least one electrode material precursor can be added to the electrode materials before or during step 105. In some embodiments, at least one electrode material can be added to the electrode material precursor before or during step 110.

Step 120 includes physically mixing the at least one electrode material and the at least one electrode material precursor after preprocessing steps 105 and 110. In some embodiments, a uniform powder mixture is formed after the mixing step. In some embodiments, step 120 includes a dry mixing step. In some embodiments, step 120 includes a wet mixing step, meaning at least one type of liquid is added during the mixing step. In some embodiments, step 120 includes more than one mixing step to obtain a uniform powder mixture. In some embodiments, step 120 is performed by a high-speed mixer, centrifuge mixer, and/or mechanical fusion machine.

Step 150 includes synthesizing the materials mixture to produce commercial-grade electrode materials. In some embodiments, the synthesizing step 150 employs a solid-state synthesizing method via heat treatment. In some embodiments, the heat treatment can be performed at a temperature of at least about 400° C., at least about 450° C., at least about 500° C., at least about 550° C., at least about 600° C., at least about 650° C., at least about 700° C., at least about 750° C., at least about 800° C., at least about 850° C., at least about 900° C., at least about 950° C., at least about 1,000° C., at least about 1,050° C., or at least about 1,100° C. In some embodiments, the heat treatment can be performed at a temperature of no more than about 1,200° C., no more than about 1,100° C., no more than about 1,050° C., no more than about 1,000° C., no more than about 950° C., no more than about 900° C., no more than about 850° C., no more than about 800° C., no more than about 750° C., no more than about 700° C., no more than about 650° C., no more than about 600° C., no more than about 550° C., no more than about 500° C., or no more than about 450° C. Combinations of the above-referenced temperatures are also possible (e.g., at least about 400° C. and no more than about 1,200° C. or at least about 500° C. and no more than about 550° C.), inclusive of all values and ranges therebetween. In some embodiments, the heat treatment can be performed at a temperature of about 400° C., about 500° C., about 600° C., about 700° C., about 800° C., about 900° C., about 1,000° C., about 1,100° C., or about 1,200° C.

In some embodiments, the heat treatment in step 150 is performed at one constant temperature. In some embodiments, the heat treatment is performed at 2 temperature stages. In some embodiments, the heat treatment is performed at 3 temperature stages. In some embodiments, the heat treatment is performed at 4 temperature stages. In some embodiments, the heat treatment is performed at 5 temperature stages. In some embodiments, the heat treatment is performed at more than 5 temperature stages. In some embodiments, at least one of the temperature stages includes low-temperature pre-heating at no more than about 50° C., no more than about 100° C., no more than about 150° C., no more than about 200° C., no more than about 250° C., no more than about 300° C., no more than about 350° C., no more than about 400° C., no more than about 450° C., no more than about 500° C., no more than about 550° C., no more than about 600° C., no more than about 650° C., no more than about 700° C., no more than about 750° C., or no more than about 800° C., inclusive. In some embodiments, the duration of a temperature stage can be at least about 30 seconds, at least about 1 min, at least about 5 min, at least about 10 min, at least about 20 min, at least about 30 min, at least about 1 h, at least about 2 h, at least about 3 h, at least about 4 h, at least about 5 h, at least about 6 h, at least about 7 h, at least about 8 h, at least about 9 h, at least about 10 h, at least about 12 h, at least about 15 h, or at least about 20 h, inclusive. In some embodiments, the temperature ramping speed to or between temperature stages is about 1° C./min, about 2° C./min, about 3° C./min, about 4° C./min, about 5° C./min, about 6° C./min, about 7° C./min, about 8° C./min, about 9° C./min, about 10° C./min, about 11° C./min, about 12° C./min, about 13° C./min, about 14° C./min, about 15° C./min, about 16° C./min, about 17° C./min, about 18° C./min, about 19° C./min, and about 20° C./min.

In some embodiments, the synthesizing can be performed in a controlled gas environment. In some embodiments, the gas environment can be inert. In some embodiments, the gas environment can include nitrogen, argon, neon, or other similar inert environments. In some embodiments, the gas environment can include $CO_2$. In some embodiments, the gas environment can be a reducing environment. In some embodiments, the gas environment can include $H_2$, a mixture of Ar and $H_2$, a mixture of $N_2$ and $H_2$, a mixture of $CO_2$ and CO, or any combination thereof. In some embodiments, the gas environment can include an oxidizing environment. An oxidizing environment can assist in the removal of organic compounds. In some embodiments, air or other aforementioned gas flows along or through the materials mixture during the synthesizing step 150. In some embodiments, no gas flows along or through the materials mixture during the synthesizing step 150. In some embodiments, the synthesizing step 150 can be performed at positive (i.e., greater than atmospheric) gas pressure (e.g., about 0.05 bar (gauge), about 0.1 bar, about 0.2 bar, about 0.3 bar, about 0.4 bar, about 0.5 bar, about 0.6 bar, about 0.7 bar, about 0.8 bar, about 0.9 bar, or about 1 bar, inclusive of all values and ranges therebetween). In some embodiments, the synthesizing step 150 can be performed under negative (i.e., less than atmospheric) gas pressure (e.g., about-0.05 bar (gauge), about-0.1 bar, about-0.2 bar, about-0.3 bar, about-0.4 bar, about-0.5 bar, about-0.6 bar, about-0.7 bar, about-0.8 bar, about-0.9 bar, or about-1 bar, inclusive of all values and ranges therebetween). In some embodiments, reductants or oxidizers can be added and mixed thoroughly with the materials mixture before the synthesizing step 150 to create a reducing or oxidizing environment.

In some embodiments, the synthesizing step 150 includes one heat treatment. In some embodiments, the synthesizing step 150 includes more than one heat treatment. In some embodiments, the synthesizing step 150 includes at least two heat treatments, at least three heat treatments, or at least four heat treatments. In some embodiments, milling, mixing and/or drying steps are optionally performed between heat treatments. In some embodiments, method 100 produces LFP or derivative electrode materials. In some embodiments, the mixing of additional precursors, such as coating and doping precursors, can be made in accordance with methods described in U.S. Provisional Patent Application No. 63/509,661 filed on Jun. 22, 2023, titled "Systems and Methods for Removal, Modification and Addition of Coatings in Electroactive Materials" and U.S. Provisional Patent Application No. 63/386,808 filed on Dec. 9, 2022, titled "Systems and Methods for Removal and Recycling of Aluminum Impurities from Battery Waste", the contents of each of which are incorporated herein by reference, before or after any heat treatment.

In some embodiments, a reducing agent is added during the mixing step 120. In some embodiments, a reducing agent is added at the end of preprocessing step 105 before entering the next step. In some embodiments, a reducing agent is added at the end of preprocessing step 110 before entering the next step. The reducing agent can create a reducing environment during the synthesizing step 150 for the synthesis of the electrode materials. A reducing environment is helpful to reduce any oxidized Fe (with a valence higher than +2) either in the electrode materials (e.g., used electrode materials) or in the electrode materials precursors. In some embodiments, the Fe oxidation of either electrode materials or electrode materials precursors happens during steps 11 to 13. In some embodiments, the Fe oxidation of the electrode materials happens during the harvesting of the electrode materials. For example, the heat treatment during the used LFP harvesting process can generate several oxidation products from LFP materials, as described above. In some embodiments, the electrode materials are not oxidized throughout the process and a reducing environment is not required in step 150.

In some embodiments, the synthesizing step 150 includes two steps of heat treatment. The reducing agent is added and well mixed with the electrode materials after the first heat treatment. In some embodiments, the reducing agent used is carbon or organic compounds such as glucose, graphite, sucrose, and/or starch. In some embodiments, the reducing agent can coat the surface of the electrode materials with carbon. In some embodiments, this coating can improve the electrochemical performance or conductivity of the electrode materials.

In some embodiments, the electrode material is LFP. In some embodiments, the electrode materials are lithium-deficient LFP ($Li_xFePO_4$, 0<x1). In some embodiments, the electrode materials are partially or fully oxidized electrode materials. In some embodiments, the oxidizing product of LFP electrodes or lithium-deficient LFP electrodes includes, $Fe_2O_3$, $Fe_3O_4$, $Li_3Fe_2(PO_4)_3$, $LiFeP_2O_7$, $FePO_4$, $Li_3PO_4$, $Li_2CO_3$, LiOH, or any combination thereof. In some embodiments, the electrode materials are oxidized after heat treatment to separate themselves from the current collector, as described in the '873 application.

In some embodiments, step 150 can include other types of synthesis methods. In some embodiments, step 150 can include a plasma treatment for synthesizing electrode materials. In some embodiments, step 150 can include electrochemical relithiation as described in the '909 patent.

Figure 2:
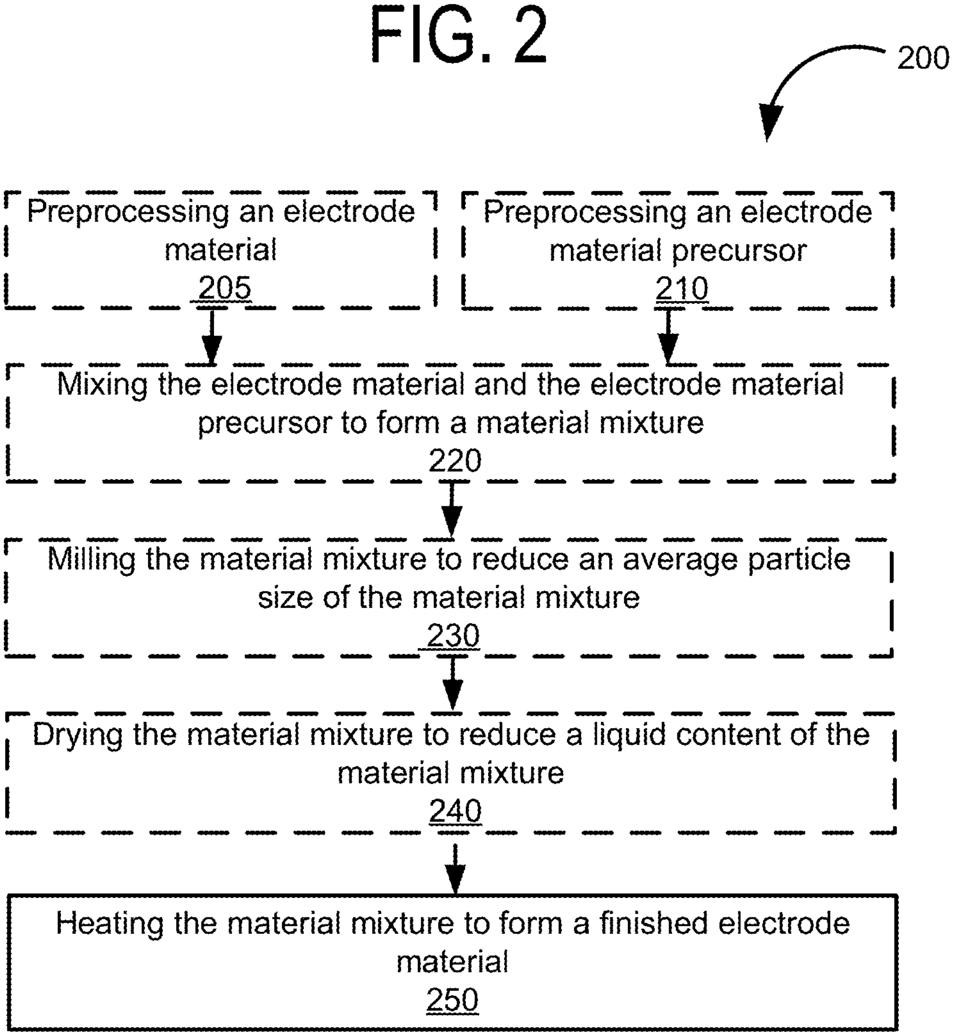
FIG. 2 is a schematic flow chart of a method of forming a finished electrode material, according to an embodiment.

FIG. 2 is a flow diagram of method 200 for producing co-synthesized finished electrode material from at least one electrode material and at least one electrode material precursor, according to an embodiment. The method 200 includes optionally preprocessing the at least one electrode material 205 and optionally preprocessing the at least one electrode material precursor 210 prior to physically mixing the preprocessed materials 220 into a uniform mixture. The details of steps 205 and 210 are substantially similar with the steps 105 and 110 described above in connection with FIG. 1. In some embodiments, a reducing agent is added during the mixing step 220.

In some embodiments, the method 200 includes optionally milling the material mixture 230. In some embodiments, step 230 reduces the particle sizes and/or agglomeration of the powder mixture. In some embodiments, step 230 forms a uniform powder mixture after milling. In some embodiments, the milling process is a dry milling process without the addition of any liquid. In some embodiments, the milling process is a wet milling process with the addition of liquid. In some embodiments, the liquid is water or an aqueous solution. In some embodiments, the liquid is ethanol, or an ethanol and water mixture. In some embodiments, the solid-liquid ratio during the milling is at least about 0.1 g/100 ml, at least about 0.5 g/100 ml, at least about 1 g/100 ml, at least about 5 g/100 ml, at least about 10 g/100 ml, or at least about 50 g/100 ml, inclusive. In some embodiments, the solid-liquid ratio during the milling is no more than 0.1 g/100 ml, no more than 0.5 g/100 ml, no more than 1 g/100 ml, no more than 5 g/100 ml, no more than 10 g/100 ml, or no more than 50 g/100 ml, inclusive. In some embodiments, water is added when method 200 is producing LFP materials. In some embodiments, step 230 can be performed with equipment such as a planetary ball mill, a horizontal ball mill, a nano bead mill, an air jet mill, and/or other similar grinding, crushing, or shredding processes or equipment, or a combination thereof. In some embodiments, the particle size and morphology of the output materials from step 230 are controlled by parameters such as milling rotary speed, milling time, size of milling medium, shape of milling medium, solid-liquid ratio, and weight ratio of milling medium. In some embodiments, step 230 includes more than one milling process. In some embodiments, the milling 230 is in a medium including $ZrO_2$.

In some embodiments, the mixing step 220 is optional, and the milling step 230 can form a uniform powder mixture. In some embodiments, an air jet mill can be used for step 230. An optional mixing step is performed after the use of air jet mill. In some embodiments, step 230 forms particles with uniform particle sizes. In some embodiments, step 230 forms particles with mixtures of different particle sizes. This can be achieved by taking out part of the particles for further milling and then mixing them back into the rest of the particles.

In some embodiments, the method 200 includes optionally drying the powder mixture (i.e., the material mixture) 240 to remove any solvent liquid still contained in the powder mixture. In some embodiments, this step is optional if no wet milling is performed in a milling step 230. The powder mixture is heated to evaporate the containing solvent liquid. In some embodiments, the drying step 240 does not change the composition and/or crystal structure of the electrode material. In some embodiments, the drying step 240 does not change the composition and/or crystal structure of the electrode material precursor. In some embodiments, the powder mixture is still uniformly mixed after drying step 240. In some embodiments, the drying step 240 is performed under vacuum conditions. In some embodiments, the drying step can reduce the particle sizes and/or agglomeration of the powder mixture. In some embodiments, step 240 is performed to further remove the moisture content or other residual amount of liquid solvent in a dry powder mixture. In some embodiments, step 240 is conducted with a spray dryer, flash dryer, rotary dryer mixer dryer, and/or vacuum dryer. In some embodiments, the particle size and/or morphology of the output materials can be controlled by adjusting the spray drying conditions, including temperatures, spraying nozzle types, solid loading, feeding speed, atomizer disc rotary speed, and atomizing hole shapes.

In some embodiments, the method 200 includes heating the materials mixture 250 to produce finished electrode materials (e.g., commercial grade electrode materials). In some embodiments, the heating step 250 includes a solid-state synthesizing method via heat treatment. The details of the heat treatment 250 for synthesizing finished electrode materials are described above in connection with step 150 of method 100.

In some embodiments, the mixing step 220 and the milling step 230 can happen simultaneously. In some embodiments, the electrode material starts the milling step 230 first, and the rest electrode material precursor is added to the milling step 230 later. In some embodiments, the electrode material precursor starts the milling step 230 first, and the rest of the electrode material is added to the milling step 230 later. In some embodiments, a portion of the electrode material and electrode material precursor forms a mixture and starts the milling step 230, and the rest of the portion of the electrode material and electrode material precursor forms another mixture and is added to the milling step 230 later. In some embodiments, the milling step 230 is divided into more than 2 stages.

Figure 3:
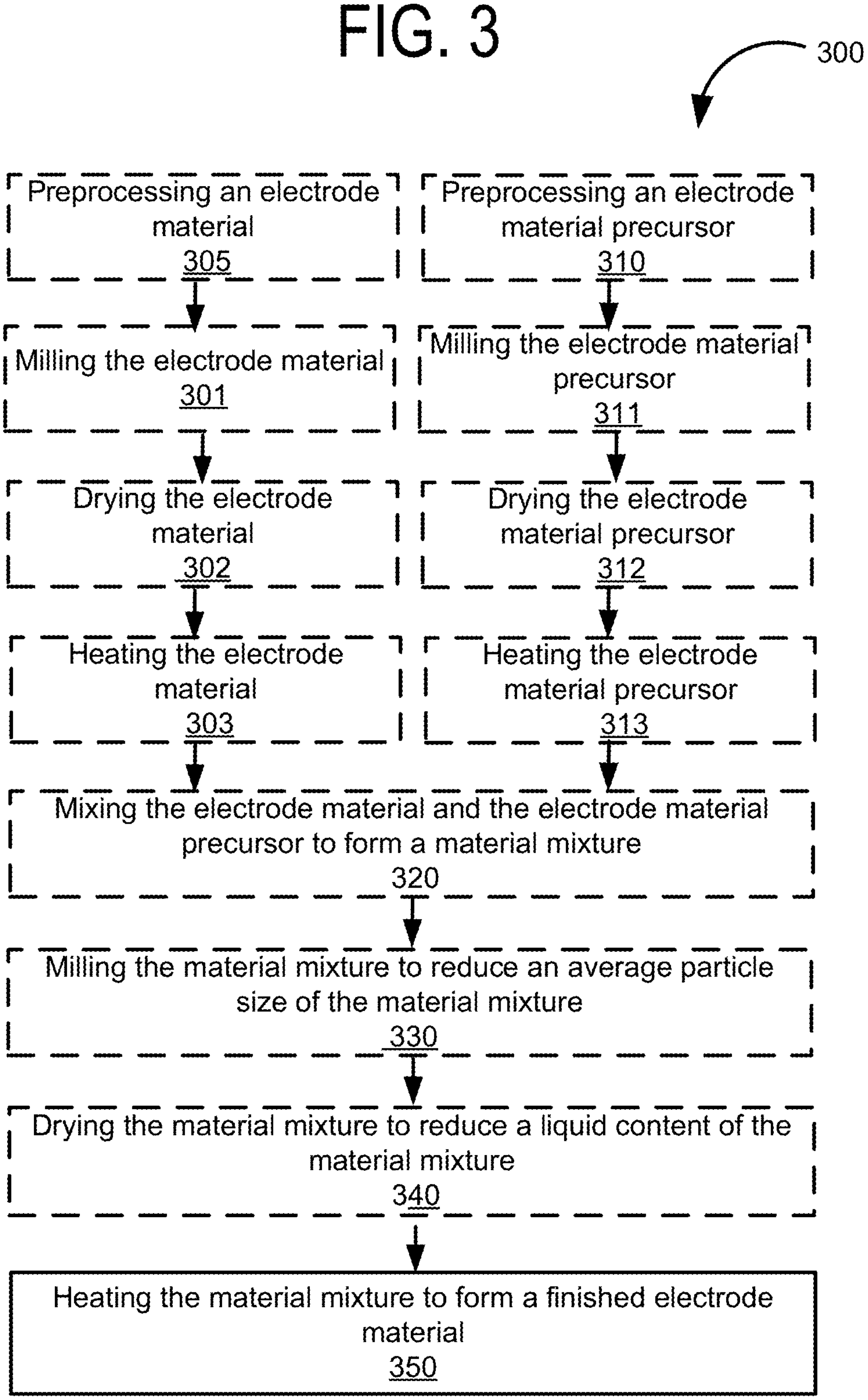
FIG. 3 is a schematic flow chart of a method of forming a finished electrode material, according to an embodiment.

FIG. 3 is a schematic flow chart of a method 300 of forming a finished electrode material, according to an embodiment. The method 300 includes mixing an electrode material and the electrode material precursor 320 for a duration of about 1 minute to about 50 hours to form a material mixture and heating the material mixture 350 at a temperature between about 400° C. and about 1,200° C. to produce a finished electrode material. In some embodiments, the mixing step 320 is optional when the method 300 includes a milling step 330 which can form a uniform powder mixture. In some embodiments, the method 300 includes preprocessing at least one of an electrode material 305 or an electrode material precursor 310 prior to mixing the electrode material and the electrode material precursor 320. In some embodiments, the preprocessing includes separating an active material from a conductive material and a binder to form the electrode material. In some embodiments, the material mixture is heated 350 for a duration of about 10 minutes to about 20 hours. In some embodiments, the heating 350 is under vacuum. In some embodiments, the method 300 optionally includes milling the material mixture 330 to reduce an average particle size of the material mixture prior to the heating 320. In some embodiments, the method 300 includes drying the material mixture 340 to reduce a liquid content of the material mixture to less than about 0.1 wt % prior to the heating. In some embodiments, the method 300 includes the milling at least one of the electrode material 301 or the electrode material precursor 311 prior to the mixing of the electrode material and the electrode material precursor 320. In some embodiments, the method 300 includes drying at least one of the electrode material 302 or the electrode material precursor 312 prior to the mixing of the electrode material and the electrode material precursor 320. In some embodiments, the method 300 includes heating at least one of the electrode material 303 or the electrode material precursor 313 prior to the mixing of the electrode material and the electrode material precursor 320. The details of the steps 301, 311 and 330 are substantially similar to the details of the step 230 described above. The details of the steps 340, 302 and 312 are substantially similar to the details of the step 240 described above. The details of the steps 350, 303 and 313 are substantially similar to the details of the step 350 described above.

In some embodiments, the milling steps 301 and 311 are optional. In some embodiments, the drying steps 302 and 312 are optional. In some embodiments, the heating steps 303 and 313 are optional. In some embodiments, the electrode material and electrode material precursor reach different particle sizes or particle size distributions before entering the mixing step 320.

In some embodiments, the mixing step 320 and the milling step 330 happen simultaneously. In some embodiments, the electrode material starts the milling step 330 first, and the rest of the electrode material precursor is added to the milling step 330 later. In some embodiments, the electrode material precursor starts the milling step 330 first, and the rest of the electrode material is added to the milling step 330 later. In some embodiments, a portion of the electrode material and electrode material precursor forms a mixture and starts the milling step 330, and the rest of the portion of the electrode material and electrode material precursor forms another mixture and is added to the milling step 330 later. In some embodiments, the milling step 330 is divided into more than 2 stages.

Figure 4:
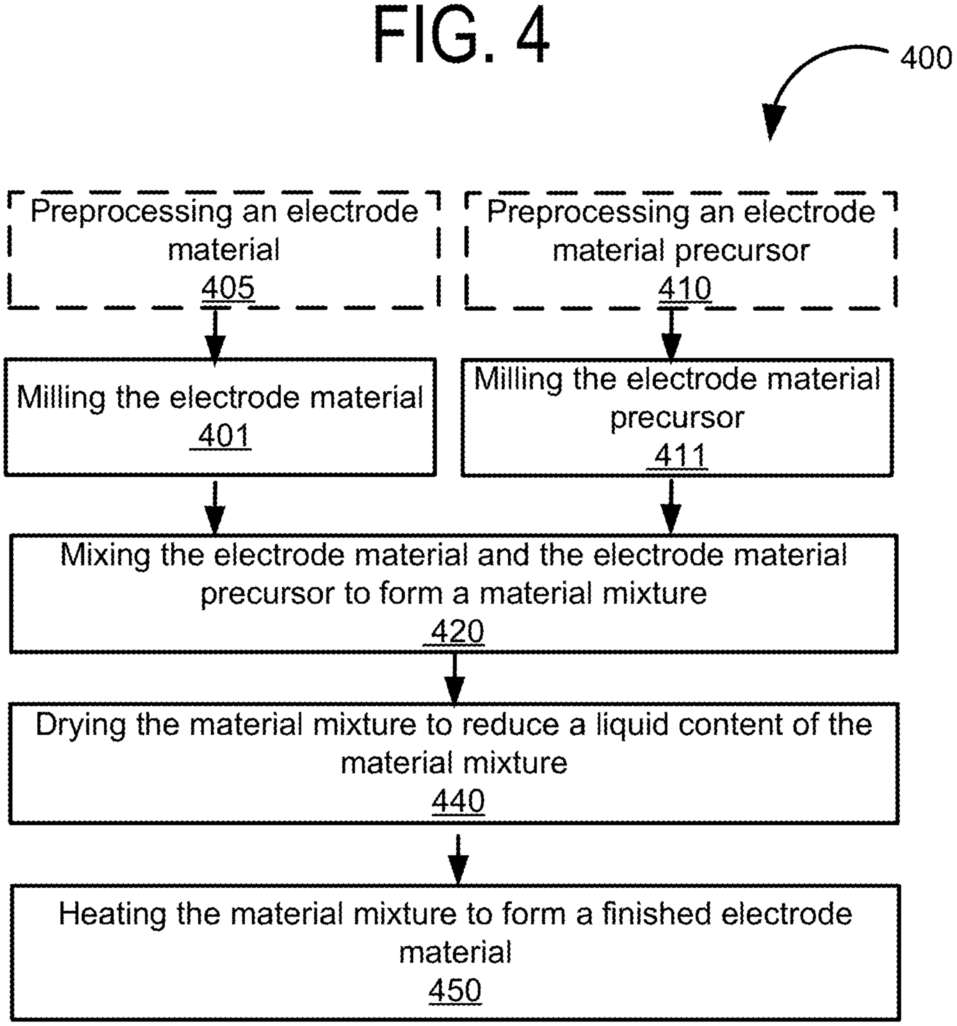
FIG. 4 is a schematic flow chart of a method of forming a finished electrode material, according to an embodiment.

FIG. 4 shows a flow diagram of method 400 to produce co-synthesized electrode materials from at least one electrode material and at least one electrode material precursor, according to an embodiment. Steps 405 and 410 include optionally preprocessing the at least one electrode material, and optionally preprocessing the at least one electrode material precursor. The details of steps 405 and 410 have been described above in steps 105 and 110 of method 100, respectively. In some embodiments, the method 400 includes milling the preprocessed at least one electrode material 401, and the preprocessed at least one electrode material precursor 411, respectively. The details of the milling steps 401 and 411 are described above in step 230 of method 200. In some embodiments, the materials obtained from step 401 and step 411 have different particle sizes. In some embodiments, the materials obtained from step 401 and step 411 have different morphologies. In some embodiments, the particle size and morphology of the output materials from steps 401 and 411 are controlled by parameters such as milling rotary speed, milling time, size of milling medium, shape of milling medium, solid-liquid ratio, and weight ratio of milling medium. In some embodiments, step 401 and step 411 uses different milling equipment.

Step 420 includes mixing the at least one electrode material and at least one electrode material precursor. The details of the mixing step 420 are described above in step 120 of method 100. In some embodiments, a reducing agent is added during the mixing step 420. In some embodiments, the method 400 includes drying the material mixture 440 to prepare for the next synthesizing step. The details of the drying step 440 are described above in step 240 of method 200. In some embodiments, step 450 includes heating the material mixture to produce commercial-grade electrode materials. In some embodiments, the heating step 450 includes a solid-state synthesizing method via heat treatment. The details of the heating 450 are described above in step 150 of method 100.

Figure 5:
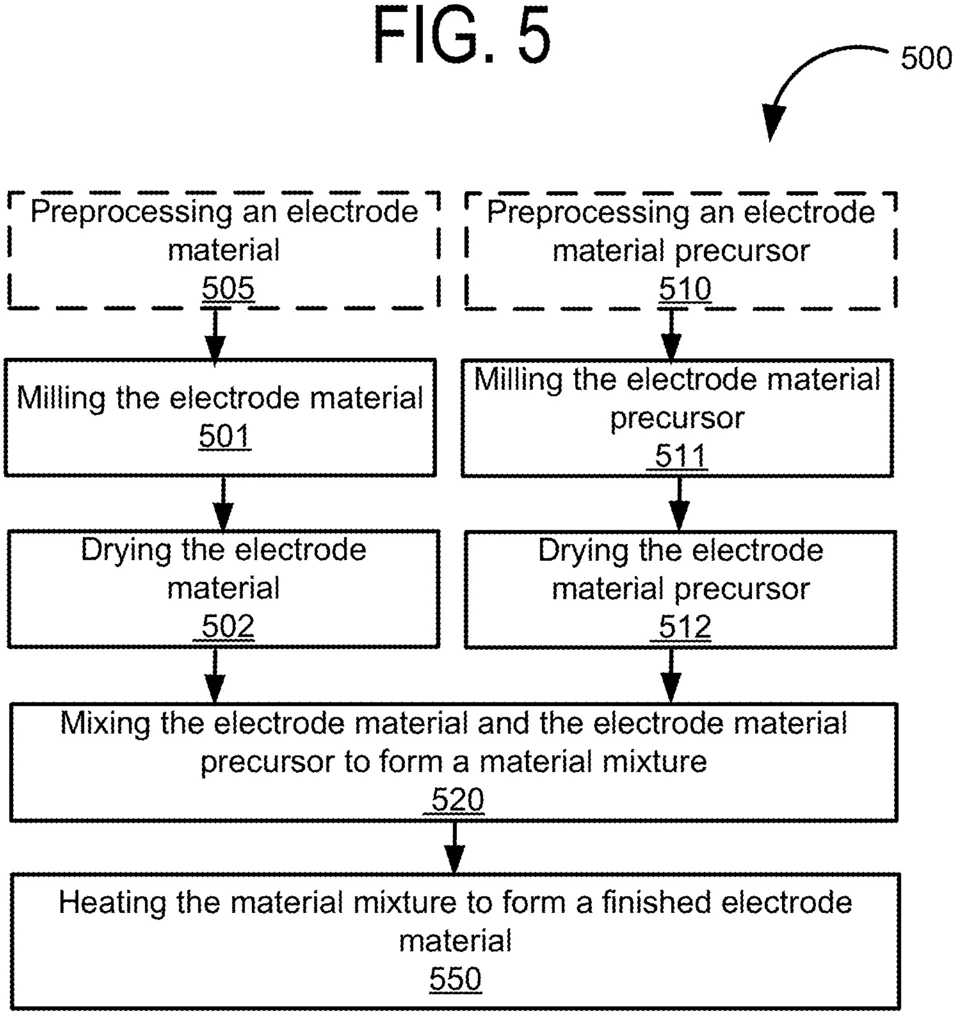
FIG. 5 is a schematic flow chart of a method of forming a finished electrode material, according to an embodiment.

FIG. 5 shows a flow diagram of method 500 to produce co-synthesized electrode materials from at least one electrode material and at least one electrode material precursor, according to an embodiment. Steps 505 and 510 include optionally preprocessing the at least one electrode material, and optionally preprocessing the at least one electrode material precursor, respectively. The details of steps 505 and 510 are substantially similar to the details of steps 105 and 110 of method 100, respectively. In some embodiments, the method 500 further includes milling the preprocessed at least one electrode material 501 and preprocessed at least one electrode material precursor 511, respectively. The details of the milling steps 501 and 511 are described above in step 230 of method 200. In some embodiments, the output materials (i.e., materials obtained) from step 501 and step 511 have different particle sizes. In some embodiments, the output materials from step 501 and step 511 have different morphologies. In some embodiments, the particle size and morphology of the output materials from step 501 and step 511 are controlled by parameters such as milling rotary speed, milling time, size of milling medium, shape of milling medium, solid-liquid ratio, and weight ratio of milling medium. In some embodiments, step 501 and step 511 uses different milling equipment and methods, as described herein.

In some embodiments, the method 500 further includes optionally drying the at least one electrode material 502 and the at least one electrode material precursor 512, respectively. The details of the drying step 502 and 512 are described in step 240 of method 200. In some embodiments, the output materials from step 502 and step 512 have different particle sizes. In some embodiments, the output materials from step 502 and step 512 have different morphologies. In some embodiments, the particle size and morphology of the output materials from step 502 and step 512 are controlled by different drying conditions. In some embodiments, step 502 and step 512 use different drying equipment.

In some embodiments, the method 500 includes mixing the at least one electrode material and at least one electrode material precursor 520. The details of the mixing step 520 are described above in step 120 of method 100. In some embodiments, a reducing agent is added during the mixing step 520. In some embodiments, the 550 includes heating the material mixture to produce commercial-grade electrode materials. In some embodiments, the heating step includes a solid-state synthesizing method via heat treatment. The details of the heating step 550 are described above in step 150 of method 100.

Figure 6:
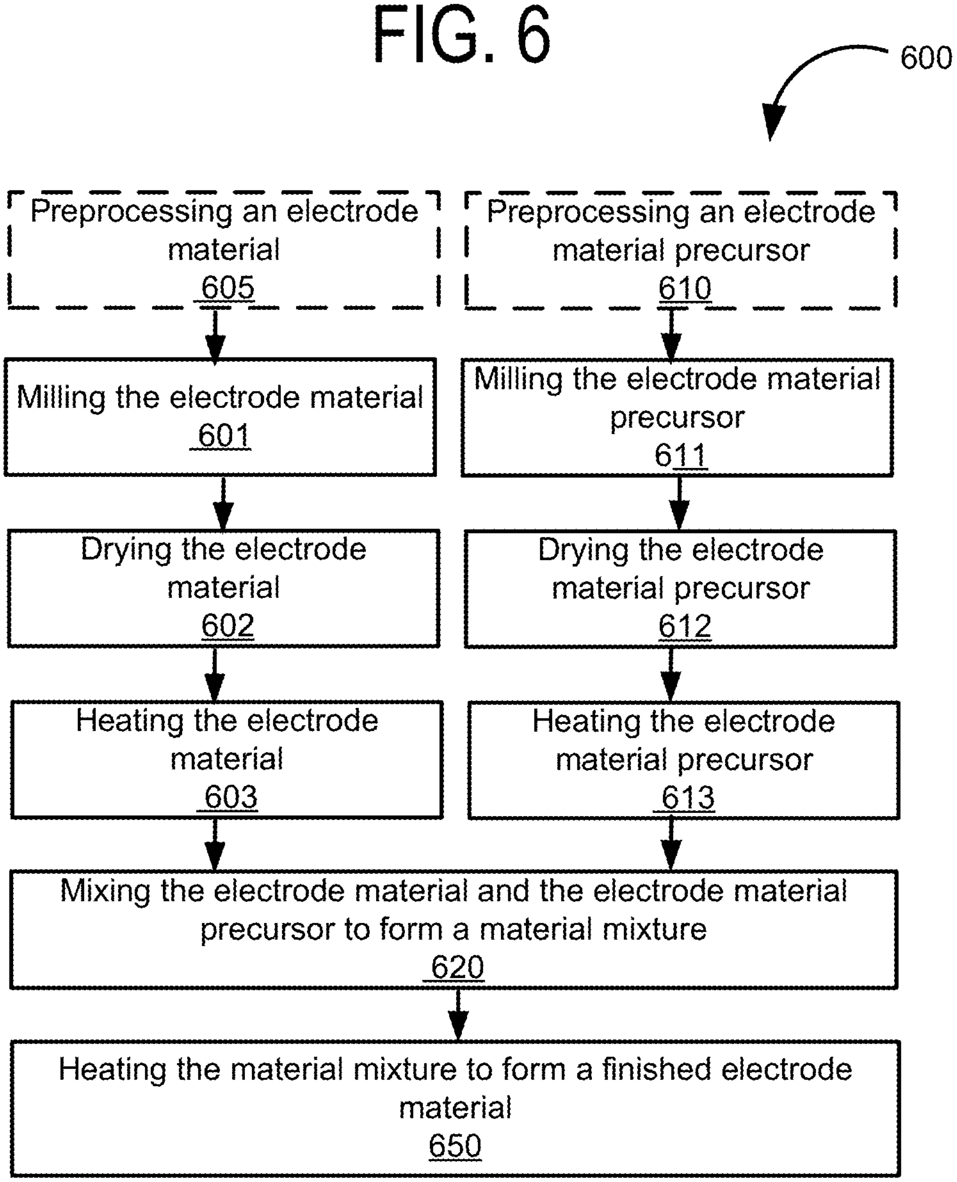
FIG. 6 is a schematic flow chart of a method of forming a finished electrode material, according to an embodiment.

FIG. 6 shows a flow diagram of method 600 to produce co-synthesized electrode materials from at least one electrode material and at least one electrode material precursor, according to an embodiment. In some embodiments, the method 600 further includes preprocessing the at least one electrode material 605, and preprocessing the at least one electrode material precursor 610, respectively. The details of steps 605 and 610 have been described above in steps 105 and 110 of method 100. In some embodiments, the method 600 further includes optionally milling the preprocessed at least one electrode material 601 and preprocessed at least one electrode material precursor 611. The details of the milling steps 601 and 611 are described above in step 230 of method 200. In some embodiments, the output materials from step 601 and step 611 have different particle sizes. In some embodiments, the output materials from step 601 and step 611 have different morphologies. In some embodiments, the particle size and morphology of the output materials from step 601 and step 611 are controlled by parameters such as milling rotary speed, milling time, size of milling medium, shape of milling medium, solid-liquid ratio, and weight ratio of milling medium. In some embodiments, step 601 and step 611 uses different milling equipment.

In some embodiments, the method 600 further includes drying the at least one electrode material 602 and the at least one electrode material precursor 612. The details of the drying step 602 and 612 are described in step 240 of method 200. In some embodiments, the output materials from step 602 and step 612 have different particle sizes. In some embodiments, the output materials from step 602 and step 612 have different morphologies. In some embodiments, the particle size and morphology of the output materials from step 602 and step 612 are controlled by different drying conditions. In some embodiments, step 602 and step 612 use different drying equipment.

In some embodiments, the method 600 further includes heating the at least one electrode material 603 and the at least one electrode material precursor 613. In some embodiments, the heat treatment step 603 and/or 613 remove impurities such as organic compounds in the at least one electrode material and/or the at least one electrode material precursor. In some embodiments, the heat treatment step 603 and/or 613 partially or entirely form the crystal structure of electrode materials via solid-state reactions. The details of the heat treatment are described above in step 150 of method 100. In some embodiments, the particle size and/or morphology of the output materials from step 603 and step 613 is controlled by heat treatment parameters such as heating temperature, heating time, heating environment and temperature ramping speed.

Step 620 includes mixing the at least one electrode material and the at least one electrode material precursor. The details of the mixing step 620 are described above in step 120 of method 100. In some embodiments, a reducing agent is added during the mixing step 620. Step 650 includes heating the material mixture to produce commercial-grade electrode materials. In some embodiments, the heating 650 includes a solid-state synthesizing method via heat treatment. The details of the heating 650 are described above in step 150 of method 100.

In some embodiments, the methods 100-600 described above can produce finished electrode materials in quantities in excess of the electrode material used at the start of the process. In some embodiments, the excess quantity of finished electrode materials is at least about 1.1 times, at least about 1.2 times, at least about 1.3 times, at least about 1.4 times, at least about 1.5 times, at least about 1.6 times, at least about 1.7 times, at least about 1.8 times, at least about 1.9 times, at least about 2.0 times, at least about 3.0 times, at least about 4.0 times, at least about 5.0 times, at least about 6.0 times, at least about 7.0 times, at least about 8.0 times, at least about 9.0 times, at least about 10.0 times, at least about 15.0 times, at least about 20.0 times, at least about 30.0 times, at least about 40.0 times, at least about 50.0 times, or at least about 100.0 times of the at least about one electrode material at the start of the process.

The methods 100-600 described above are different from the direct recycling methods that relithiate a lithium deficient electrode material with a lithium source. In the methods described herein, co-synthesis methods can regenerate an existing electrode material (e.g., a waste electrode material) while synthesizing a new electrode material from an electrode material precursor (e.g., a virgin electrode material precursor or a waste electrode material precursor). Accordingly, the amount of the finished electrode materials obtained from the methods 100-600 described above is higher than the amount of the electrode material used at the start of the process.

In some embodiments, the methods 100-600 described above can simultaneously regenerate (e.g., relithiate) the electrode material and synthesizes new electrode materials from the electrode material precursor. That is, the methods 100-600 described above can regenerate an electrode material while generating a new electrode material from an electrode material precursor. In some embodiments, the regenerating includes relithiation. In some embodiments, the electrode material precursor can include an electrode material precursor including lithium. In some embodiments, the lithium has a quantity that is sufficient to simultaneously relithiate the electrode material and synthesize new electrode materials from other electrode material precursors.

In some embodiments, the methods 100-600 described above can produce co-synthesized electrode materials that are a mixture of more than one composition of electrode material. In some embodiments, the mixture of compositions of co-synthesized electrode materials includes at least one of the compositions of the starting electrode materials. In some embodiments, the co-synthesized electrode materials includes at least one composition that is not a composition of the starting electrode materials. This co-synthesized electrode material composition can be generated from the electrode material precursors. In some embodiments, at least one of the co-synthesized electrode material compositions can be generated through the methods described herein by altering the composition of the at least one electrode material using the at least one electrode material precursor. For example, $LiNi_{0.8}Mn_{0.1}Co_{0.1}O_2$ can be co-synthesized from $LiNi_{0.33}Mn_{0.33}Co_{0.33}O_2$ with the addition of extra nickel electrode material precursor along with NCM811 precursor or a mixture of nickel, manganese, and cobalt precursor, as well as lithium precursor, in stoichiometric ratios corresponding to the synthesis of $LiNi_{0.8}Mn_{0.1}Co_{0.1}O_2$.

In some embodiments, the methods 100-600 described above can produce co-synthesized electrode materials with high compact densities. In some embodiments, the co-synthesized LFP materials have a compact density of at least 2.0 g/cm$^3$, at least 2.1 g/cm$^3$, at least 2.2 g/cm$^3$, at least 2.3 g/cm$^3$, at least 2.4 g/cm$^3$, at least 2.5 g/cm$^3$, at least 2.6 g/cm$^3$, and at least 2.7 g/cm$^3$.

In some embodiments, the at least one electrode material precursors in the methods 100-600 described above can be fully or partially replaced by recycled electrode precursor materials.

In some embodiments, the lithium source precursors (e.g., $Li_2CO_3$ and/or LiOH) can be recycled from used and/or waste battery electrode materials. In some embodiments, the Fe and P source precursors (e.g., $FePO_4$) for the production of LFP materials can be recycled from used and/or waste battery electrode materials.

In some embodiments, the at least one electrode material and the at least one electrode material precursor used in the methods 100-600 described above can be replaced by recycled electrode materials and virgin electrode materials, respectively. In such embodiments, the heating steps 150, 250, 350, 450, 550 and 650 can be optional.

In some embodiments, additives are mixed in with the at least one electrode material and the at least one electrode material precursor used in the methods 100-600 described above. In some embodiments, additives are mixed in during any of the mixing steps and/or milling steps. In some embodiments, the additives enhance the electrode material and/or the electrode material precursor dispersion and improve the milling efficiency. In some embodiments, the additive is polyvinylpyrrolidone. In some embodiments, the additives provide an additional lithium source for the electrode materials. In some embodiments, the additives include but are not limited to, $Li_2CO_3$, LiOH, $Li_3PO_4$, and/or $LiNO_3$. In some embodiments, the additives form conductive carbon in the final produced electrode materials. In some embodiments, the additives include but are not limited to glucose, sucrose, starch, citric acid, polyethylene glycol, polyvinyl alcohol, polyvinylpyrrolidone, polybutylene, polystyrene, polypropylene, and polyethylene. In some embodiments, the additives provide additional iron sources for the electrode materials. In some embodiments, the additives provide additional phosphate sources for the electrode materials. In some embodiments, the additives form surface coating or lattice doping for the electrode materials. In some embodiments, the additives include but are not limited to $TiO_2$, $V_2O_5$, MgO, $ZrO_2$, $Al_2O_3$, and $Nb_2O_5$.

COMPARATIVE EXAMPLE

Used electrode materials and electrode materials precursors were combined according to an embodiment described herein to produce commercial-grade electrode materials. Used electrode materials (LFP electrode materials) were collected by the following steps: 1) LFP electrode waste scrap was heated at about 500° C. in either air or $N_2$ for 1 h; 2) The electrode materials were physically separated from the current collector and collected; 3) The LFP electrode materials was then heated at about 700° C. in $N_2$ or air for 1 h. About 3.5 g of LFP electrode materials, mixed with about 0.4 g of glucose and about 0.047 g of lithium hydroxide monohydrate, went through a ball milling process with the addition of water.

On the other path, about 4.5 g of $FePO_4$ and about 1.135 g of $Li_2CO_3$ were mixed and ball-milled for 4 h. The mixture was then heated at about 700° C. in $N_2$ for 5 h. After the heat treatment, 0.4 g of glucose was added to the materials mixture. The materials mixture was then ball milled for 2 h with the addition of water.

Figure 7:
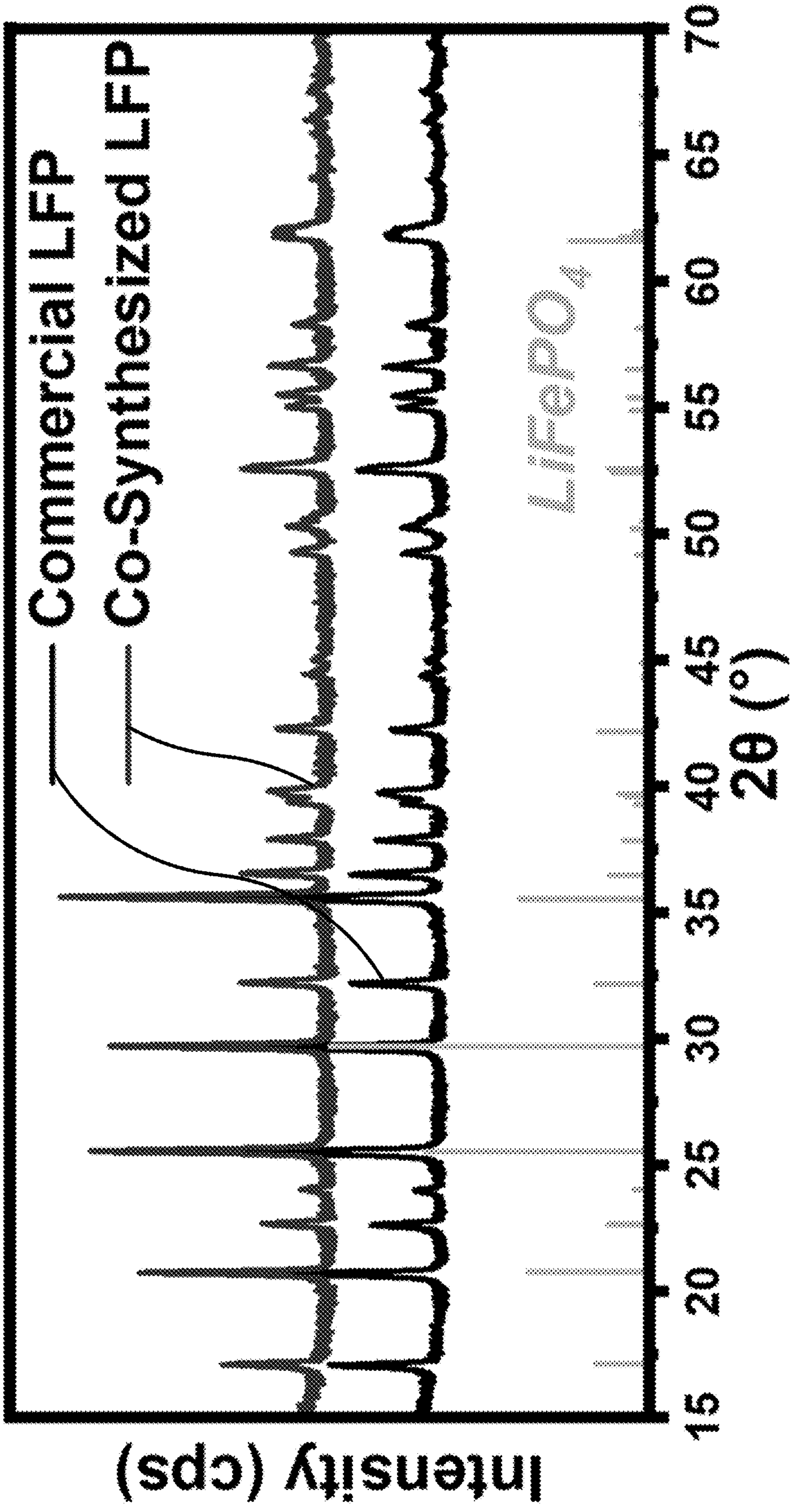
FIG. 7 shows the X-ray diffraction (XRD) pattern for synthesized lithium iron phosphate (LFP) samples according to embodiments described herein, and standard comparative LFP materials.

The processed LFP electrode materials and the precursor materials were dried separately and then mixed together with a weight ratio of about 50:50. After thorough mixing, the materials mixture was sintered at about 700° C. with flowing $N_2$ gas for 10 h to produce commercial-grade LFP electrode materials. FIG. 7 shows that the X-ray diffraction pattern of the synthesized LFP materials matched well with the standard LFP electrode materials.

Figure 8:
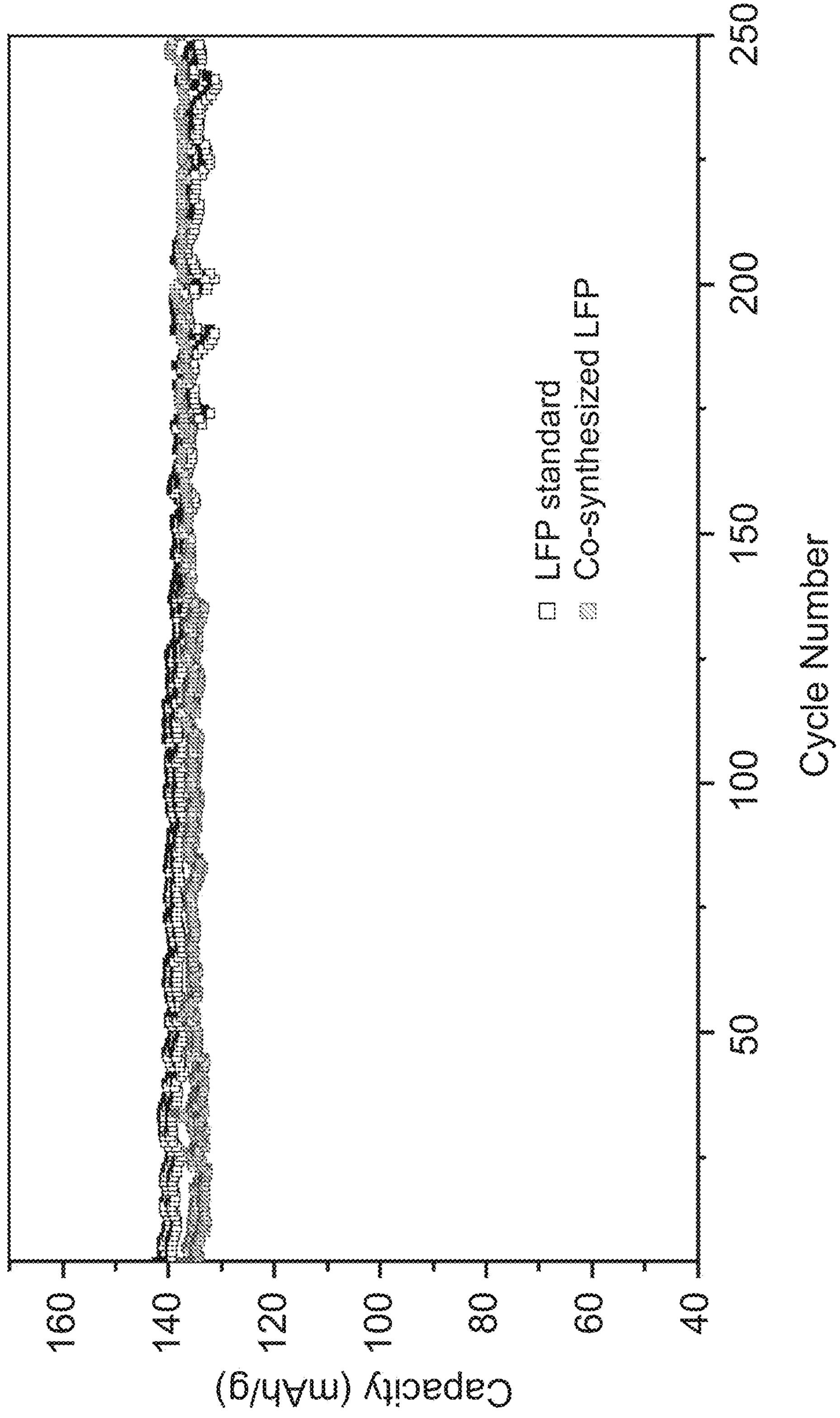
FIG. 8 shows the charge/discharge cycling performance for synthesized LFP samples according to embodiments described herein, and standard comparative LFP materials.
Figure 9:
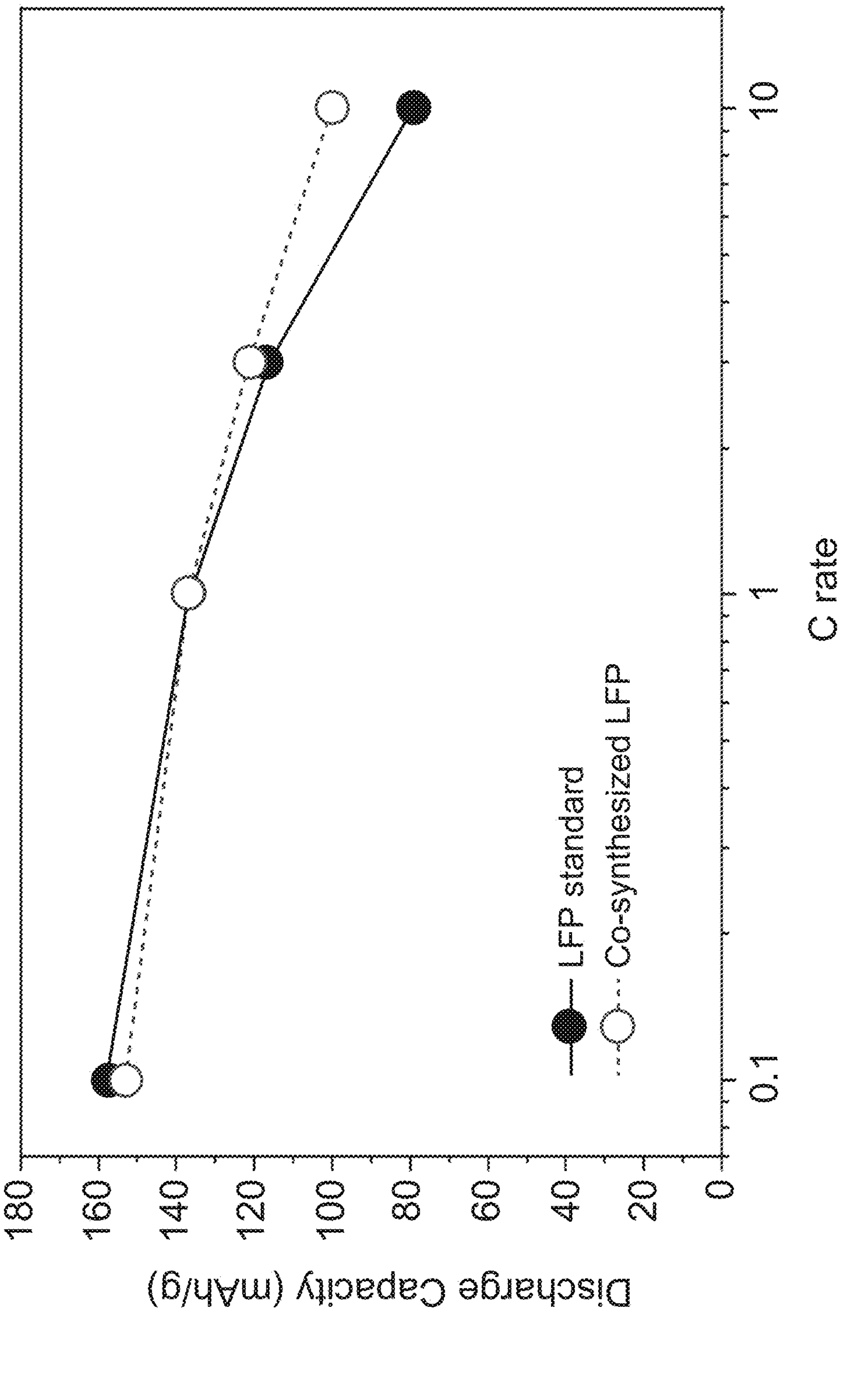
FIG. 9 shows the rate performance for synthesized LFP samples according to embodiments described herein, and standard comparative LFP materials.

The electrochemical performance of the produced LFP materials was measured in CR-2032 type coin cells composed of a lithium metal counter electrode, a polypropylene separator, and an electrolyte of 1 M $LiPF_6$ in EC/DMC (3:7 by volume). The working electrodes are prepared by mixing 80 weight percent (wt %) recycled powder with 10 wt % PVDF and 10 wt % conductive carbon. The coin cells are charged and discharged at a 1 C rate for the cycling test. FIG. 8 shows that the synthesized LFP materials delivered a capacity at 1 C rate comparable to standard LFP cathode materials. FIG. 9 shows that the synthesized LFP materials had comparable discharge capacity at low rate and had higher discharge capacity at higher rate, compared to standard LFP cathode materials.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified, and such modification are in accordance with the variations of the invention. Additionally, certain of the steps may be performed concurrently in a parallel process, when possible, as well as performed sequentially as described above. The embodiments have been particularly shown and described, but it will be understood that various changes in form and details may be made.

The invention claimed is:

1. A method, comprising:

providing a first virgin electrode material precursor including at least one of $Li_2CO_3$, LiOH, or $Li_3PO_4$;

providing a second virgin electrode material precursor including at least one of $Fe_2O_3$, $Fe_3O_4$, $Fe(C_2H_3O_2)_2$, $FeSO_4$, $FeC_2O_4$, $FePO_4$, $Fe_3(PO_4)_2$, $(NH_4)_3PO_4$, $NH_4H_2PO_4$, $(NH_4)_2HPO_4$, $Co_3O_4$, CoO, $Co(OH)_2$, $CoCO_3$, $CoSO_4$, $Co(NO_3)_2$, $Ni(OH)_2$, $Ni(NO_3)_2$, $Ni(CH_3COO)_2$, $NiSO_4$, $Mn(OH)_2$, $Mn(NO_3)_2$, $Mn(CH_3COO)_2$, $MnSO_4$, $Al(NO_3)_3$, $Al_2(SO_4)_3$, $Al(OCH(CH_3)_2)_3$, $Ni_{0.33}Mn_{0.33}Co_{0.33}(OH)_2$ (NMC111 $(OH)_2$), $Ni_{0.5}Mn_{0.3}Co_{0.2}(OH)_2$ (NMC532$(OH)_2$), $Ni_{0.6}Mn_{0.2}Co_{0.2}(OH)_2$ (NMC622$(OH)_2$), or $Ni_{0.8}Mn_{0.1}Co_{0.1}(OH)_2$ (NMC811$(OH)_2$);

providing a lithium deficient electrode material;

mixing the first virgin electrode material precursor, the second virgin electrode material precursor, and the lithium deficient electrode material for a duration of about 1 minute to about 50 hours to form a material mixture; and heating the material mixture at a temperature between about 400° C. and about 1,200° C. to produce a finished electrode material, wherein the heating causes regeneration of the lithium deficient electrode material and formation of a new electrode material, the new electrode material formed from the first virgin electrode material precursor and the second virgin electrode material precursor, and wherein both the regenerated lithium deficient electrode material and the formed new electrode material have the same stoichiometry.

2. The method of claim 1, further comprising:

preprocessing at least one of the lithium deficient electrode material, the first electrode material precursor, or the second electrode material precursor prior to mixing the first electrode material precursor, the second electrode material precursor, and the lithium deficient electrode material.

3. The method of claim 2, wherein the preprocessing includes forming the lithium deficient electrode material from a battery waste material.

4. The method of claim 2, wherein the preprocessing includes separating an active material from at least one of a conductive material, a binder, or a current collector to form the lithium deficient electrode material.

5. The method of claim 1, wherein the material mixture is heated for a duration of about 10 minutes to about 20 hours.

6. The method of claim 1, wherein the heating is under vacuum.

7. The method of claim 1, wherein the lithium deficient electrode material includes at least one of $LiCoO_2$, $LiMn_2O_4$, NCM, $Li_xM_yPO_4$, where Mis a transition metal and x and y are positive real numbers, $LiFePO_4$, a derivative of $LifePO_4$, or $LiM_kFe_{1-k}PO_4$, where M is a transition metal and $0 \leq k < 1$.

8. The method of claim 1, wherein the lithium deficient electrode material is partially or entirely formed from a battery waste material.

9. The method of claim 8, wherein the battery waste material includes at least one of defected lithium-ion batteries, manufacturing scrap of lithium-ion batteries, end-of-life lithium-ion batteries, manufacturing scrap of lithium-ion battery cathode, or manufacturing scrap of lithium-ion battery electrodes.

10. The method of claim 1, further comprising:
milling the material mixture to reduce an average particle size of the material mixture prior to the heating.

11. The method of claim 10, wherein milling is in a medium including $ZrO_2$.

12. The method of claim 1, further comprising:
drying the material mixture to reduce a liquid content of the material mixture to less than about 0.1 wt % prior to the heating.

13. The method of claim 12, wherein the drying includes at least one of spray drying or vacuum drying.

14. The method of claim 13, wherein the vacuum drying is under the vacuum in a range of about 1 mbar to about 1,000 mbar.

15. The method of claim 1, further comprising:
milling at least one of the lithium deficient electrode material, the first electrode material precursor, or the second electrode material precursor prior to the mixing of the lithium deficient electrode material, the first electrode material precursor, and the second electrode material precursor.

16. The method of claim 1, further comprising:
drying at least one of the lithium deficient electrode material, the first electrode material precursor, or the second electrode material precursor prior to the mixing of the lithium deficient electrode material, the first electrode material precursor, and the second electrode material precursor.

17. The method of claim 1, further comprising:
heating at least one of the lithium deficient electrode material, the first electrode material precursor, or the second electrode material precursor prior to the mixing of the lithium deficient electrode material, the first electrode material precursor, and the second electrode material precursor.

18. The method of claim 1, wherein regeneration of the lithium deficient electrode material includes relithiation.

19. The method of claim 1, further comprising:
adding an additive to at least one of the lithium deficient electrode material, the first electrode material precursor, or the second electrode material precursor.

20. The method of claim 19, wherein adding the additive causes at least one of the electrode material, the first electrode material precursor, or the second electrode material precursor to disperse.

21. The method of claim 20, where the additive includes at least one of polyethylene glycol, polyvinyl alcohol, or polyvinylpyrrolidone.

22. The method of claim 19, wherein the additive includes an additional lithium source.

23. The method of claim 19, wherein the additive forms a carbon coating on the electrode material.

24. The method of claim 23, wherein the additive includes at least one of glucose, sucrose, starch, citric acid, polyethylene glycol, polyvinyl alcohol, polyvinylpyrrolidone, polybutylene, polystyrene, polypropylene, or polyethylene.

25. The method of claim 19, wherein the additive forms a surface coating on, or is doped into a lattice of at least one of the electrode material, the first electrode material precursor, or the second electrode material precursor.

26. The method of claim 25, wherein the additive includes at least one of $TiO_2$, $V_2O_5$, MgO, $ZrO_2$, $Al_2O_3$, or $Nb_2O_5$.

27. The method of claim 1, wherein the lithium deficient electrode material comprises a lithium content that is from about 1% to about 99% less than stoichiometric lithium content of a fully lithiated electrode material.

28. The method of claim 27, wherein the lithium content of the lithium deficient electrode material is from about 1% to about 50% of the stoichiometric lithium content of the fully lithiated electrode material.

29. The method of claim 1, wherein the finished electrode material has a compact density of at least 2.0 $g/cm^3$.

30. The method of claim 1, wherein the heating is performed under inert or reducing environment.

31. The method of claim 1, further comprising:
pre-heating the material mixture at a temperature of about 150° C. or below.

* * * * *